E. H. McCLELLAND.
CUSHION SWAB FOR CYLINDERS.
APPLICATION FILED JULY 6, 1915.

1,200,001.

Patented Oct. 3, 1916.

Inventor.
Earby H. McClelland.
By Edward ⟨signature⟩
Atty.

UNITED STATES PATENT OFFICE.

EARBY H. McCLELLAND, OF TUCSON, ARIZONA, ASSIGNOR, BY MESNE ASSIGNMENTS, TO HEIMBACH PATENTS PROMOTION CO., A CORPORATION OF ARIZONA.

CUSHION-SWAB FOR CYLINDERS.

1,200,001. Specification of Letters Patent. Patented Oct. 3, 1916.

Application filed July 6, 1915. Serial No. 38,073.

*To all whom it may concern:*

Be it known that I, EARBY H. McCLELLAND, a citizen of the United States, residing at Tuscon, in the county of Pima and State of Arizona, have invented certain new and useful Improvements in Cushion-Swabs for Cylinders, of which the following is a specification.

This invention relates to cushion swabs for cylinders and especially to cushion swabs for air brake cylinders.

It is an object of this invention to provide a cushion swab which will preserve the piston packing of motors, pumps and the like, keeping it soft and pliable and lengthening its life.

Another object is to provide a cushion swab which will decrease leakage and prevent the rubber gasket between the cylinder and cylinder head from blowing out which would help to cut the leather packing of the piston and damage the tripple valve in air brake systems.

In air brake systems, as at present constructed, the packing leather upon the piston becomes dry, preventing a tight fit and interfering with the operation of the air brake system, causing wrecks and runaways. Steel expanders have been used to help press the packing against the cylinder, but these expanders shorten the life of the packing leather.

My invention includes a cushion swab made of felt, or other soft absorbent material which is placed at one end of the cylinder and is soaked with oil. It is so disposed that the packing leather on the piston comes in contact therewith at the end of the instroke of the piston, thereby oiling the leather, keeping it soft and putting life into it.

Figure 2:
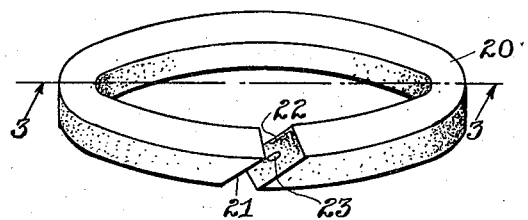
Figure 3:
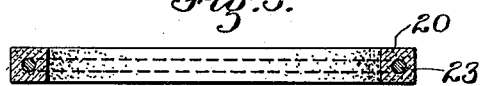
Figure 1:
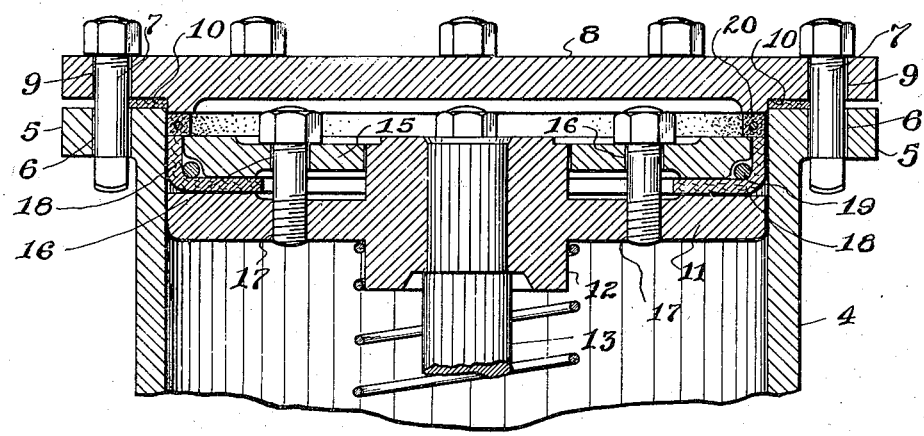

I attain these objects by means of the embodiment of my invention illustrated in the accompanying drawing, in which:

Figure 1 is a fragmentary sectional view of an air brake cylinder. Fig. 2 is a perspective view of my improved swab. Fig. 3 is a sectional view taken on the line 3—3 of Fig. 2.

More specifically, 4 indicates the usual air brake cylinder provided at one end with flanges 5 having apertures 6 for receiving bolts 7. A cylinder head 8 is provided with apertures 9 which register with apertures 6 and receive the bolt 7 for securing the cylinder head 8 to the brake cylinder 4. 10 is the usual rubber gasket which is positioned between the cylinder head and brake cylinder, and is for the purpose of preventing leakage. A piston 11 is disposed within the cylinder 4 and is preferably provided at its center with an apertured boss 12 to which a rod 13 is secured. A follower plate 15 is provided which has apertures 16 registering with threaded apertures 17 in the piston 11 for the reception of bolts to secure the follower plate 15 to the piston 11.

Disposed between the follower plate 15 and the piston 11 is a packing leather 18 providing a tight non-leak fit between the piston and the brake cylinder. Expander ring 19 of the usual type presses the leather against the outer wall. This expander ring, however, may be done away with in my construction.

My invention resides particularly in the swab 20 which is made of felt or similar soft absorbent material. It is ring-shaped having a split at one point with preferably beveled faces 21 and 22 which are in contact with one another when the ring is in place. A steel wire 23 assists in preserving the form of the swab and holding it in place when positioned in the brake cylinder. The steel wire, however, is not a material part of my invention.

In the operation of the brake cylinder, swab 20 is positioned within the cylinder and against the cylinder head, thereby acting as an additional packing and preventing the blowout of the gasket 10. The usual lubrication of the brake cylinder provides oil for the swab 20, the latter absorbing the oil. As the piston reaches the inner end of its stroke the swab 20 comes in contact with the leather 18 and keeps it soft and pliable. When the brake cylinder is not in operation, the leather 18 rests against the swab 20 and the oil therein is conveyed to the leather preventing it from drying out so that a car if standing for some time can be placed in operation with the certainty that the leather will provide a tight fit and prevent leakage.

It is obvious that I have provided a simple device which lengthens the life of the cylinder packing, prevents blowout of the cylinder head gasket and adds materially to the safety of the air brake.

What I claim is:

1. In an air brake, the combination of a cylinder, provided with a cylinder head, a piston disposed therein, a packing mounted on said piston and a cushion swab impregnated with oil disposed in the cylinder contiguously to the cylinder head and adapted to contact with said packing during the reciprocation of said piston.

2. In an air brake, the combination of a cylinder provided with a cylinder head, a piston therein, a packing mounted on said piston and an annular cushion swab impregnated with a lubricant disposed in the cylinder contiguously to the cylinder head and adapted to contact with said packing during the reciprocation of the piston.

3. In an air brake, the combination of a cylinder provided with a cylinder head, a piston therein, a leather packing ring mounted on said piston and a cushion swab impregnated with oil disposed in the cylinder contiguously to said head and adapted to contact with said packing during the operation of the cylinder.

4. In an air brake, the combination of a cylinder provided with a cylinder head, a piston therein, a leather packing ring mounted on said piston and an annular cushion swab of felt impregnated with oil disposed in the cylinder contiguously to the cylinder head, and adapted to contact with said packing ring during the operation of the piston.

5. In an air brake, the combination of a cylinder, a piston therein, a packing mounted on said piston and a cushion swab impregnated with a lubricant disposed in the cylinder and adapted to contact with said packing at the end of the stroke of the piston whereby said packing is preserved, and an air tight joint between said cylinder and said piston is maintained.

In witness that I claim the foregoing I have hereunto subscribed my name this 25 day of June, 1915.

EARBY H. McCLELLAND.